US008811415B2

(12) United States Patent
Chung et al.

(10) Patent No.: US 8,811,415 B2
(45) Date of Patent: Aug. 19, 2014

(54) ROUTING APPARATUS AND NETWORK APPARATUS

(75) Inventors: Moo-Kyoung Chung, Yongin-si (KR);
Soo-Jung Ryu, Hwaseong-si (KR);
Woong Seo, Hwaseong-si (KR);
Ho-Young Kim, Seoul (KR);
Young-Chul Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 13/092,919

(22) Filed: Apr. 23, 2011

(65) Prior Publication Data

US 2012/0092987 A1    Apr. 19, 2012

(30) Foreign Application Priority Data

Oct. 13, 2010  (KR) ................ 10-2010-0099826

(51) Int. Cl.
*H04L 12/26*    (2006.01)

(52) U.S. Cl.
USPC ........... 370/401; 370/229; 370/428; 370/252; 370/235

(58) Field of Classification Search
CPC ........ H04J 1/16; H04L 12/413; H04L 1/24; H04Q 11/0407; H04B 3/32
USPC .......... 370/229, 235, 401, 252, 428; 375/222, 375/240
See application file for complete search history.

(56) References Cited

U.S. PATENT DOCUMENTS

| | | | | |
|---|---|---|---|---|
| 5,384,780 A | * | 1/1995 | Lomp et al. | 370/238 |
| 5,751,694 A | * | 5/1998 | Toft | 370/503 |
| 5,841,971 A | * | 11/1998 | Longginou et al. | 709/200 |
| 6,300,887 B1 | * | 10/2001 | Le | 341/60 |
| 6,377,573 B1 | * | 4/2002 | Shaffer et al. | 370/356 |
| 7,058,728 B1 | * | 6/2006 | Eklund | 709/247 |
| 7,466,701 B2 | | 12/2008 | Mondinelli et al. | |
| 7,697,563 B2 | | 4/2010 | Sobelman et al. | |
| 7,733,771 B2 | | 6/2010 | Clermidy et al. | |
| 2002/0196743 A1 | * | 12/2002 | Thalanany et al. | 370/252 |
| 2003/0202606 A1 | * | 10/2003 | Tinker | 375/240.27 |
| 2005/0008037 A1 | * | 1/2005 | Koren et al. | 370/474 |
| 2005/0083944 A1 | * | 4/2005 | Liu et al. | 370/395.5 |
| 2007/0115939 A1 | | 5/2007 | Lee et al. | |
| 2008/0005402 A1 | | 1/2008 | Kim et al. | |
| 2008/0320171 A1 | * | 12/2008 | Walsh et al. | 709/247 |
| 2010/0329256 A1 | * | 12/2010 | Akella et al. | 370/392 |
| 2011/0058474 A1 | * | 3/2011 | Nagapudi et al. | 370/235 |

FOREIGN PATENT DOCUMENTS

| | | |
|---|---|---|
| KR | 10-2006-0081489 | 7/2006 |
| KR | 10-2006-00814789 | 7/2006 |
| KR | 10-0675850 | 1/2007 |
| KR | 10-0758983 | 9/2007 |
| KR | 10-2009-0092421 | 9/2009 |

* cited by examiner

*Primary Examiner* — Rasheed Gidado
(74) *Attorney, Agent, or Firm* — NSIP Law

(57) ABSTRACT

A routing apparatus and a network apparatus that are capable of improving general system performance by compressing/decompressing data and transmitting the result of the compression/decompression, are provided. The routing apparatus may compress and/or decompress input data, and may transmit the compressed and/or decompressed input data.

19 Claims, 9 Drawing Sheets

ROUTING APPARATUS AND NETWORK APPARATUS

CROSS-REFERENCE TO RELATED APPLICATION(S)

This application claims the benefit under 35 U.S.C. §119(a) of Korean Patent Application No. 10-2010-0099826, filed on Oct. 13, 2010, in the Korean Intellectual Property Office, the entire disclosure of which is incorporated herein by reference for all purposes.

BACKGROUND

1. Field

The following description relates to a routing apparatus and a network apparatus that can effectively transmit data from a source component to a destination component.

2. Description of the Related Art

Due to the ever-intensifying convergence of computer, communication, and broadcasting technologies, the public is increasingly being diverted from application specific integrated circuits (ASICs) and application specific standard products (ASSPs) to System-on-Chip (SoC) products. Recent developments in information technology (IT) have expedited the development of the SoC industry.

SoC is a technique of integrating all components of a complicated electronic system into a single integrated chip (IC). Various researches have been conducted on methods with which to implement SoC, and particularly, to interconnect various intellectual properties (IPs) in an IC.

Conventional techniques of interconnecting IPs are typically based on buses. However, in a bus structure, a bus used by one IP is no longer available for other IPs. As a result, SoC-based devices using a bus structure have difficulty in expanding. Thus, as the integration density of ICs and the amount of data transmitted between IPs increases, SoC-based devices using a bus structure increasingly face numerous structural limitations.

In order to overcome the limitations of SoC, Network on Chip (NoC) has been suggested. NoC is a technique of interconnecting IPs by applying a typical network technology to an IC. Researches are currently being conducted on ways to improve the performance of NoC-based devices in terms of power consumption and transmission time.

SUMMARY

In one general aspect, there is provided a routing apparatus including a compression/decompression unit configured to compress or decompress input data within a data processing time, and the data processing time is a period of time between the time when data is received and the time when the data is output, and a transmission unit configured to transmit the compressed input data or decompressed input data.

The routing apparatus may further comprise a determination unit configured to determine whether congestion has occurred and/or whether congestion has been resolved, wherein, if congestion occurs, the compression/decompression unit continues to compress the input data until the congestion is resolved.

The routing apparatus may further comprise a determination unit configured to determine whether the routing apparatus is a last routing apparatus on a path of the transmission of the input data and whether the input data has been fully decompressed, wherein, if the routing apparatus is the last routing apparatus on the path of the transmission of the input data and the input data has not yet been fully decompressed, the compression/decompression unit decompresses the input data until the input data is fully decompressed.

The routing apparatus may further comprise a memory unit configured to temporarily store at least one of the input data, the compressed input data, and the decompressed input data.

The transmission unit may comprise a switching module, and a control module configured to control the switching module to transmit at least one of the compressed input data and the decompressed input data to a next routing apparatus.

In another aspect, there is provided a network apparatus that transmits data via a plurality of routing apparatuses, each of the routing apparatuses including a compression/decompression unit configured to compress or decompress input data within a data processing time, and the data processing time is a length of time between the time when data is received and the time when the data is output, and a transmission unit configured to transmit the compressed or decompressed input data, wherein the routing apparatuses use an iterative compression/decompression mode, and the compression/decompression units of each routing apparatus compress and/or decompress the input data more than one time throughout a course of the transmission of the input data.

The compression/decompression units of the routing apparatuses may be classified into a first compression/decompression group that compresses the input data throughout a course of the transmission of the input data, and a second compression/decompression group that decompresses the compressed input data provided by the first compression/decompression group throughout the course of the transmission of the input data.

Each of the routing apparatuses may further comprise a determination unit configured to determine whether congestion has occurred or been resolved, wherein, if congestion is determined, the compression/decompression unit of the routing apparatus continues to compress the input data until the congestion is resolved.

Each of the routing apparatuses may further comprise a determination unit configured to determine whether a corresponding routing apparatus is a last routing apparatus on a path of the transmission of the input data and whether the input data has been fully decompressed, wherein the compression/decompression units of the corresponding routing apparatus repeatedly decompress the input data until the input data is fully decompressed, if the corresponding routing apparatus is the last routing apparatus on the path of the transmission of the input data and the input data and the input data has not yet been fully decompressed.

In another aspect, there is provided a network apparatus which transmits data via a plurality of routing apparatuses, each of the routing apparatuses including a compression/decompression unit configured to compress or decompress input data within a data processing time, and the processing time is a length of time between the time when data is received and the time when the data is output, and a transmission unit configured to transmit the compressed or decompressed input data, wherein the routing apparatuses use a non-iterative compression/decompression mode, and the compression/decompression units of each routing apparatus compress or decompress the input data only once throughout a course of the transmission of the input data.

The compression/decompression units of the routing apparatuses may be classified into a first compression/decompression group each compressing the input data only once throughout a course of the transmission of the input data, and a second compression/decompression group each decompressing the compressed input data provided by the first compression/decompression group only once throughout the course of the transmission of the input data.

Each of the routing apparatuses may further comprise a determination unit configured to determine whether congestion has occurred or been resolved, wherein, if congestion is determined, the compression/decompression unit of the routing apparatus continues to compress the input data until the congestion is resolved.

Each of the routing apparatuses may further comprise a determination unit configured to determine whether a corresponding routing apparatus is a last routing apparatus on a path of the transmission of the input data and whether the input data has been fully decompressed, wherein the compression/decompression unit of the corresponding routing apparatus repeatedly decompresses the input data until the input data is fully decompressed, if the corresponding routing apparatus is the last routing apparatus on the path of the transmission of the input data and the input data has not yet been fully decompressed.

In another aspect, there is provided a network-on-chip (NOC) including a first component that transmits/receives data to and from a second component, a first data router on a data transmission path between the first component and the second component, and the first data router compresses data that is transmitted between the first component and the second component, and a second data router on the data transmission path between the first component and the second component, and the second data router decompresses data that is compressed by the first routing apparatus and that is transmitted between the first component and the second component.

The first data router may comprise a determining unit for determining whether there is congestion on the data transmission path between the first component and the second component, and in response to the determining unit determining there is congestion, the first data router may compress the transmitted data until the data is fully compressed or until the congestion is resolved.

The first data router may be a plurality of first data routers that each perform a stage of the compression, and the second data router may be a plurality of second data routers that each perform a stage of the decompression.

The final second data router on the data transmission path may comprise a determining unit to determine whether additional decompression is to be performed, wherein, in response to performing a stage of decompression, the determining unit may determine whether there is additional decompression to be performed, and if there is additional decompression to be performed, the final second data router may continue to perform stages of decompression until the data is fully decompressed.

The first data router may compress data and the second data router may decompress data, when data is transmitted from the first component to the second component, and the second data router may compress data and the first data router may decompress data, when data is transmitted from the second component to the first component.

Other features and aspects may be apparent from the following detailed description, the drawings, and the claims.

Figure 1:
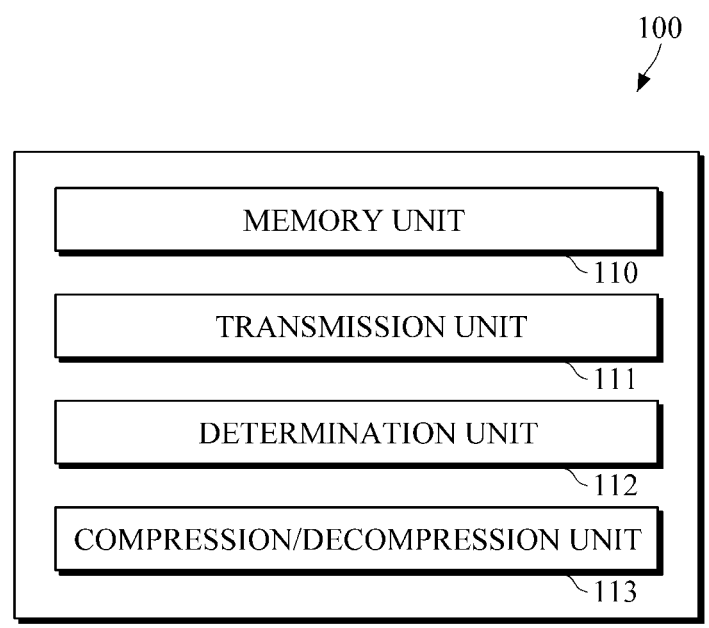
FIG. 1 is a diagram illustrating an example of a routing apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a routing apparatus.

Referring to FIG. 1, routing apparatus 100 includes a memory unit 110, a transmission unit 111, a determination unit 112, and a compression/decompression unit 113.

The memory unit 110 may temporarily store data, for example, input data, compressed data, and/or decompressed data. The memory unit 110 may be a buffer that temporarily stores data. For example, data input to the routing apparatus 100 may be temporarily stored in the memory unit 110. As another example, the input data may be compressed or decompressed by the compression/decompression unit 113, and the compressed or decompressed data may be temporarily stored in the memory unit 110.

The transmission unit 111 may transmit the compressed or decompressed data to another routing apparatus or components. In this example, components may be entities that transmit or receive data via routing apparatuses. For example, components may be intellectual properties (IPs) or cores. The transmission unit 111 may include a switching module (not shown) and a control module (not shown). The control module may control the switching module to transmit the input data, the compressed data, and/or the decompressed data to another routing apparatus.

The determination unit 112 may determine whether the routing apparatus 100 is the last routing apparatus on the path of the transmission of the input data. The determination unit 112 may also determine whether the decompression of the input data is complete. In certain aspects, the determination unit 112 may determine whether congestion has occurred and/or whether congestion has been resolved.

The compression/decompression unit 113 may compress or decompress the input data. For example, the compression/decompression unit 113 may compress or decompress the input data, and may store the compressed or decompressed input data in the memory unit 110. As another example, the compression/decompression unit 113 may compress or decompress data stored in the memory unit 110. In this example, the compressed or decompressed data stored in the memory unit 110 may be transmitted to another routing apparatus via the transmission unit 111.

The compression/decompression unit 113 may compress or decompress the input data within a data processing time. For example, the data processing time may indicate, but is not limited to, the length of a period of time between the time when data is received and the time when the data is output. As an example, the data processing time may include a route computing time, a switch allocation time, a switch traversal time, and the like. As another example, the data processing time may not indicate the time taken to transmit data from one routing apparatus to another.

In response to congestion occurring, the compression/decompression unit 113 may continue to compress the input data until the congestion is resolved. In this example, the occurrence and resolution of congestion may be determined by the determination unit 112.

In response to the determination unit 112 determining that the routing apparatus 100 is the last routing apparatus on the path of the transmission of the input data, and that the decompression of the input data is yet to be complete, the compression/decompression unit 113 may decompress the input data until the input data is fully decompressed or until the congestion clears.

Figure 2:
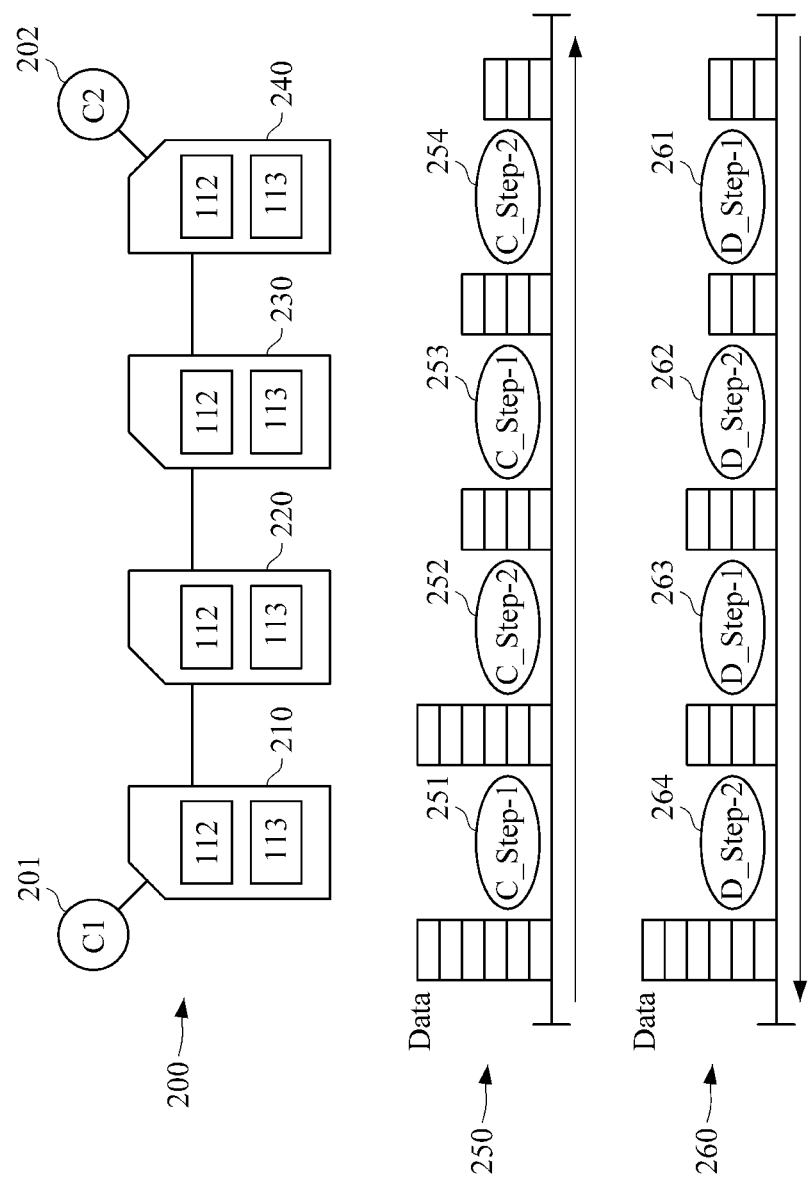
FIG. 2 is a diagram illustrating an example of an iterative compression/decompression-type network apparatus.

FIG. 2 illustrates an example of an iterative compression/decompression-type network apparatus.

Referring to FIG. 2, network apparatus 200 includes a first component 201, a second component 202, and first, second, third, and fourth routing apparatus 210, 220, 230, and 240, respectively. For example, the network apparatus 200 may be a network-on-chip (NoC). Each of the first, second, third and fourth routing apparatuses 210, 220, 230 and 240 may include a determination unit 112 and a compression/decompression unit 113. In the example of FIG. 2, the network apparatus 200 includes four routing apparatus. However, the number of routing apparatus is not limited thereto. For example, the network apparatus may include one routing apparatus, two routing apparatuses, three routing apparatus, four routing apparatus, or more routing apparatuses. This is also true for the example shown in FIGS. 3-9.

For example, the compression/decompression unit 113 of each of the first, second, third, and fourth routing apparatuses 210, 220, 230 and 240 may perform only a portion of a compression process. Data may be transmitted between the first and second components 201 and 202 via the first, second, third, and fourth routing apparatuses 210, 220, 230, and 240. For example, a data processing time of one second may be allocated to each of the first, second, third, and fourth routing apparatuses 210, 220, 230 and 240. For example, a compression or decompression process may be performed in two stages (i.e., first and second compression or decompression stages) and may include a total of two seconds (i.e., one second for the first compression or decompression stage and one second for the second compression or decompression stage) to be completed.

Referring to reference numeral 250 of FIG. 2, in order to transmit data to the second component 202, as indicated by reference numeral 250, the first component 201 may transmit the data to the first routing apparatus 210. In this example, the first routing apparatus 210 may partially compress the data that is provided by the first component 201 by performing the first compression stage within a data processing time of one second, as indicated by reference numeral 251. The first routing apparatus 210 may transmit the partially-compressed data to the second routing apparatus 220.

The second routing apparatus 220 may perform the second compression stage on the partially-compressed data that is provided by the first routing apparatus 210 within another data processing time of one second, as indicated by reference numeral 252, thereby obtaining once-compressed data. The second routing apparatus 220 may transmit the once-compressed data to the third routing apparatus 230.

The third routing apparatus 230 may partially compress the once-compressed data provided by the second routing apparatus 220 by performing the first compression stage within another data processing time of one second, as indicated by reference numeral 253. The third routing apparatus 230 may transmit the partially-compressed data to the fourth routing apparatus 240.

The fourth routing apparatus 240 may perform the second compression stage on the partially-compressed data that is provided by the third routing apparatus 230 within another data processing time of one second, as indicated by reference numeral 254, thereby obtaining twice-compressed data. The fourth routing apparatus 240 may transmit the twice-compressed data to the second component 202. In this example, the data provided by the first component 201 becomes smaller, passing through the first, second, third, and fourth routing apparatuses 210, 220, 230, and 240.

Referring to reference numeral 260 of FIG. 2, to transmit data to the first component 201, the second component 202 may transmit the data to the fourth routing apparatus 240. The fourth routing apparatus 240 may partially decompress the data that is provided by the second component 202 by performing the first decompression stage within a data processing time of one second, as indicated by reference numeral 261. The fourth routing apparatus 240 may transmit the partially-decompressed data to the third routing apparatus 230.

The third routing apparatus 230 may perform the second decompression stage on the partially-decompressed data that is provided by the fourth routing apparatus 240 within another data processing time of one second, as indicated by reference numeral 262, thereby obtaining once-decompressed data. The third routing apparatus 230 may transmit the once-decompressed data to the second routing apparatus 220.

The second routing apparatus 220 may partially decompress the data provided by the third routing apparatus 230 by performing the first decompression stage within another data processing time of one second, as indicated by reference numeral 263. The second routing apparatus 220 may transmit the partially-decompressed data to the first routing apparatus 210.

The first routing apparatus 210 may perform the second decompression stage on the data provided by the third routing apparatus 230 within another data processing time of one second, as indicated by reference numeral 264, thereby obtaining twice-decompressed data. The first routing apparatus 210 may transmit the twice-decompressed data to the first component 201. The twice-decompressed data provided by the first routing apparatus 210 may be the same as the initial data provided by the first component 201 to the first routing apparatus 210.

The first, second, third and fourth routing apparatuses 210, 220, 230, and 240 may be separate from one another. As an example, the first, second, third and fourth routing apparatuses 210, 220, 230, and 240 may be controlled by a routing apparatus controller, or may be driven in accordance with instruction information that is included in data input to the network apparatus 200. For example, the instruction information may include information on whether to and/or how to compress or decompress the input data.

In the example of FIG. 2, it is possible to reduce the amount of data to be transmitted from one component to another component, the probability of the occurrence of congestion, the power consumption of a network apparatus, and the bandwidth required by compressing data and transmitting the compressed data. In this example, no memory is needed to compress or decompress data. Moreover, no additional processing time needs to be allocated for compressing or decompressing data.

Figure 3:
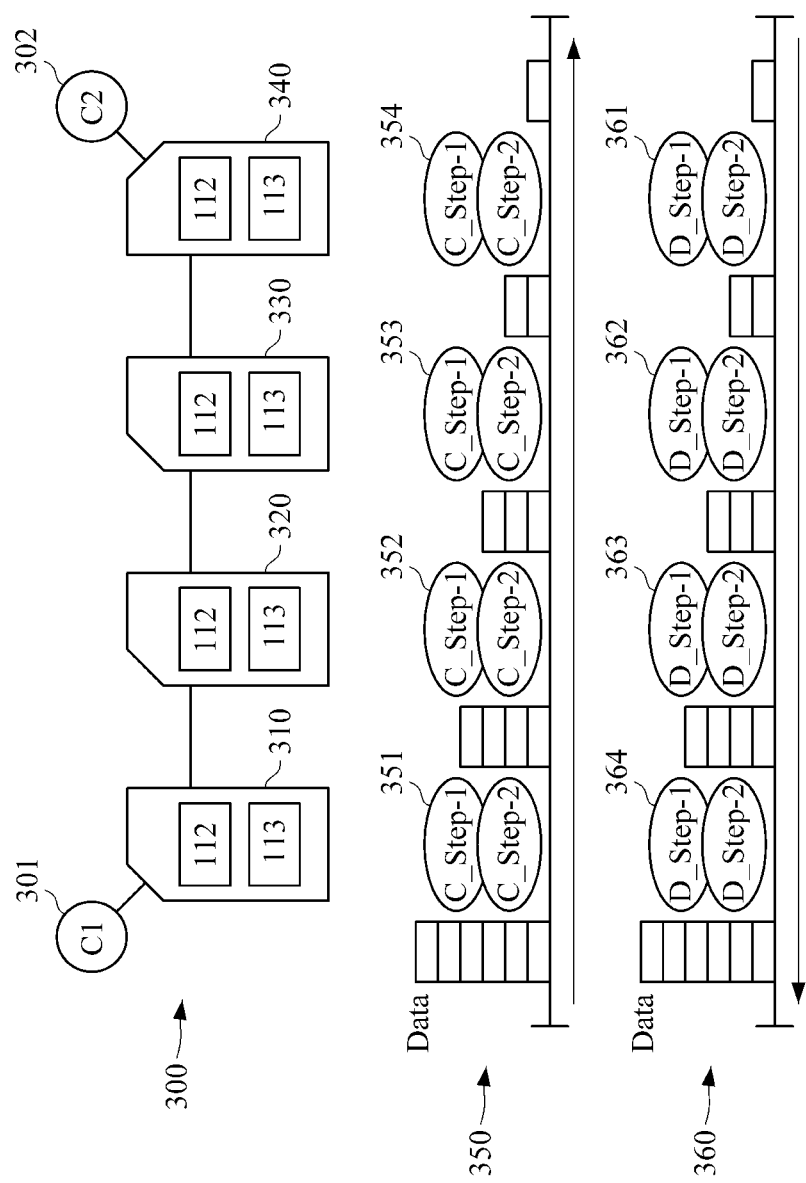
FIG. 3 is a diagram illustrating another example of an iterative compression/decompression-type network apparatus.

FIG. 3 illustrates another example of an iterative compression/decompression-type network apparatus.

Referring to FIG. 3, network apparatus 300 includes a first component 301, a second component 302, and first, second, third, and fourth routing apparatus 310, 320, 330, and 340, respectively. Each of the first, second, third and fourth routing apparatuses 310, 320, 330 and 340 may include a determination unit 112 and a compression/decompression unit 113.

In this example, the compression/decompression unit 113 of each of the first, second, third, and fourth routing apparatuses 310, 320, 330 and 340 performs a whole compression process. Data may be transmitted between the first and second components 301 and 302 via the first, second, third, and fourth routing apparatuses 310, 320, 330, and 340. For example, a data processing time of one second may be allocated to each of the first, second, third, and fourth routing apparatuses 310, 320, 330 and 340. A compression or decompression process may be performed in two stages (i.e., first and second compression or decompression stages) and may include a total of one second (i.e., one half second for the first compression or decompression stage and one half for the second compression or decompression stage) to be completed.

Referring to reference numeral 350 of FIG. 3, to transmit data to the second component 302, the first component 301 may transmit the data to the first routing apparatus 310. The first routing apparatus 310 may compress the data that is provided by the first component 301 within a data processing time of one second, as indicated by reference numeral 351. The first routing apparatus 310 may transmit the once-compressed data to the second routing apparatus 320.

The second routing apparatus 320 may compress the once-compressed data that is provided by the first routing apparatus 310 within another data processing time of one second, as indicated by reference numeral 352. The second routing apparatus 320 may transmit the twice-compressed data to the third routing apparatus 330.

The third routing apparatus 330 may compress the twice-compressed data that is provided by the second routing apparatus 320 within another data processing time of one second, as indicated by reference numeral 353. The third routing apparatus 330 may transmit the triple-compressed data to the fourth routing apparatus 340.

The fourth routing apparatus 340 may compress the triple-compressed data provided by the third routing apparatus 330 within another data processing time of one second, as indicated by reference numeral 354. The fourth routing apparatus 340 may transmit the quadruple-compressed data to the second component 302. In this example, the data provided by the first component 301 becomes smaller, passing through the first, second, third, and fourth routing apparatuses 310, 320, 330, and 340.

Referring to reference numeral 360 of FIG. 3, to transmit data to the first component 301, the second component 302 may transmit the data to the fourth routing apparatus 340. The fourth routing apparatus 340 may decompress the data that is provided by the second component 302 within a data processing time of one second, as indicated by reference numeral 361. The fourth routing apparatus 340 may transmit the once-decompressed data to the third routing apparatus 330.

The third routing apparatus 330 may decompress the once-decompressed data that is provided by the fourth routing apparatus 340 within another data processing time of one second, as indicated by reference numeral 362. The third routing apparatus 330 may transmit the twice-decompressed data to the second routing apparatus 320.

The second routing apparatus 320 may decompress the twice-decompressed data that is provided by the third routing apparatus 330 within another data processing time of one second, as indicated by reference numeral 363. The second routing apparatus 320 may transmit the triple-decompressed data to the first routing apparatus 310.

The first routing apparatus 310 may decompress the triple-decompressed data that is provided by the second routing apparatus 320 within another data processing time of one second, as indicated by reference numeral 364. The first routing apparatus 310 may transmit the quadruple-decompressed data to the first component 301. The quadruple-decompressed data provided by the first routing apparatus 310 may be the same as its original data provided by the first component 301 to the first routing apparatus 310.

In the example shown in FIG. 3, it is possible to reduce the amount of data transmitted from one component to another component, the probability of the occurrence of congestion, the power consumption of a network apparatus, and the bandwidth used by compressing data and transmitting the compressed data. In this example, no memory is needed to compress or decompress data. Moreover, no additional processing time needs to be allocated for compressing or decompressing data.

Figure 4:
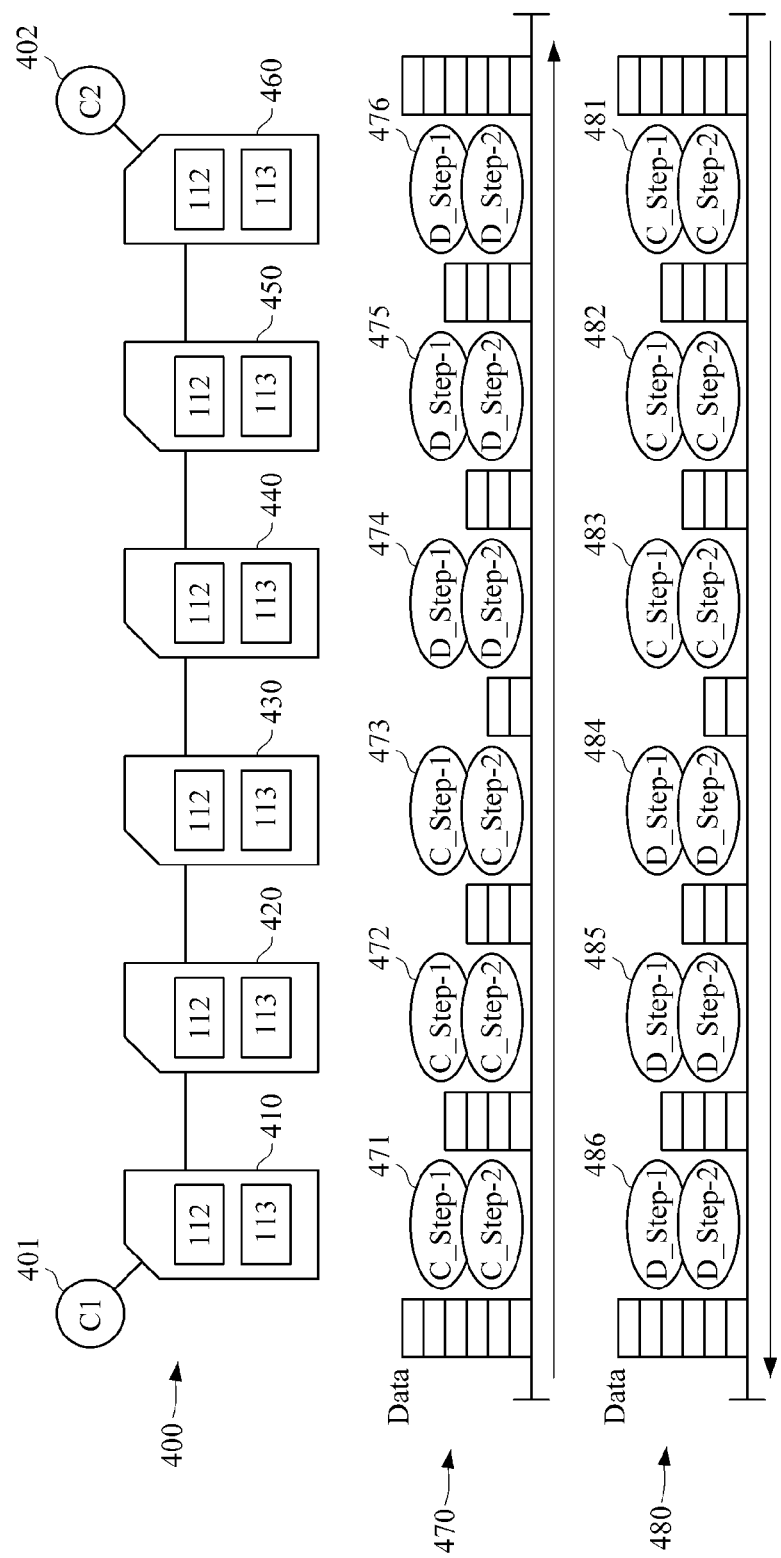
FIG. 4 is a diagram illustrating another example of an iterative compression/decompression-type network apparatus.

FIG. 4 illustrates another example of an iterative compression/decompression-type network apparatus.

Referring to FIG. 4, a network apparatus 400 includes a first component 401, a second component 402, and first, second, third, fourth, fifth, and sixth routing apparatus 410, 420, 430, 440, 450, and 460, respectively. In this example, the first, second, and third routing apparatuses 410, 420, and 430 are classified into a first compression/decompression group, and the fourth, fifth and sixth routing apparatuses 440, 450, and 460 are classified into a second compression/decompression group. Each of the first, second, third, fourth, fifth, and sixth routing apparatuses 410, 420, 430, 440, 450, and 460 include a determination unit 112 and a compression/decompression unit 113.

The first compression/decompression group may compress data until the data is fully compressed, that the second compression/decompression group may decompress data until the data is fully decompressed. Data may be transmitted between the first and second components 401 and 402 via the first, second, third, fourth, fifth, and sixth routing apparatuses 410, 420, 430, 440, 450, and 460. For example, a data processing time of one second may be allocated to each of the first, second, third, fourth, fifth, and sixth routing apparatuses 410, 420, 430, 440, 450, and 460. The compression or decompression process may be performed in two stages (i.e., first and second compression or decompression stages) and may include a total of one second (i.e., one half second for the first compression or decompression stage and one half for the second compression or decompression stage) to be completed.

Referring to reference numeral 470 of FIG. 4, to transmit data to the second component 402, the first component 401 may transmit the data to the first routing apparatus 410. The first routing apparatus 410 may compress the data that is provided by the first component 401 within a data processing time of one second, as indicated by reference numeral 471. For example, the first routing apparatus 410 may perform the first and second compression stages on the data provided by the first component 401. The first routing apparatus 410 may transmit the once-compressed data to the second routing apparatus 420.

The second routing apparatus 420 may compress the once-compressed data that is provided by the first routing apparatus 410 within another data processing time of one second, as indicated by reference numeral 472. The second routing apparatus 420 may transmit the twice-compressed data to the third routing apparatus 430.

The third routing apparatus 430 may compress the twice-compressed data that is provided by the second routing apparatus 420 within another data processing time of one second, as indicated by reference numeral 473. The third routing apparatus may transmit the triple-compressed data to the fourth routing apparatus 440. In this example, the data provided by the first component 401 becomes smaller, passing through the first, second, and third routing apparatuses 410, 420, and 430.

The fourth routing apparatus 440 may decompress the triple-compressed data that is provided by the third routing apparatus 430 within another data processing time of one second, as indicated by reference numeral 474. For example, the fourth routing apparatus 440 may perform the first and second decompression stages on the triple-compressed data provided by the third routing apparatus 430. The fourth routing apparatus 440 may transmit the once-decompressed (i.e. twice compressed) data to the fifth routing apparatus 450.

The fifth routing apparatus 450 may decompress the once-decompressed data that is provided by the fourth routing apparatus 440 within another data processing time of one second, as indicated by reference numeral 475. The fifth routing apparatus 450 may transmit the twice-decompressed (i.e. once compressed) data to the sixth routing apparatus 460.

The sixth routing apparatus 460 may decompress the twice-decompressed data that is provided by the fifth routing apparatus 450 within another data processing time of one second, as indicated by reference numeral 476. In this example, the triple-compressed data provided by the third routing apparatus 430 becomes larger, passing through the fourth, fifth, and sixth routing apparatuses 440, 450, and 460. The triple-decompressed data obtained by the sixth routing apparatus 460 may be the same as the original data provided by the first component 401 to the first routing apparatus 410. The sixth routing apparatus 460 may transmit the triple-decompressed data to the second component 402.

Referring to reference numeral 480 of FIG. 4, to transmit data to the first component 401, the second component 402 may transmit the data to the sixth routing apparatus 460. The sixth routing apparatus 460 may compress the data that is provided by the second component 402 within a data processing time of one second, as indicated by reference numeral 481. For example, the sixth routing apparatus 460 may perform the first and second compression stages on the data provided by the second component 402. The sixth routing apparatus 460 may transmit the once-compressed data to the fifth routing apparatus 450.

The fifth routing apparatus 450 may compress the once-compressed data that is provided by the sixth routing apparatus 460 within another data processing time of one second, as indicated by reference numeral 482. The fifth routing apparatus 450 may transmit the twice-compressed data to the fourth routing apparatus 440.

The fourth routing apparatus 440 may compress the twice-compressed data that is provided by the fifth routing apparatus 450 within another data processing time of one second, as indicated by reference numeral 483. In this example, the data provided by the second component 402 becomes smaller, passing through the sixth, fifth, and fourth routing apparatuses 460, 450, and 440. The fourth routing apparatus 440 may transmit the triple-compressed data to the third routing apparatus 430.

The third routing apparatus 430 may decompress the triple-compressed data that is provided by the fourth routing apparatus 440 within another data processing time of one second, as indicated by reference numeral 484. For example, the third routing apparatus 430 may perform the first and second compression stages on the triple-compressed data provided by the fourth routing apparatus 440. The third routing apparatus 430 may transmit the once-decompressed data to the second routing apparatus 420.

The second routing apparatus 420 may decompress the once-decompressed data that is provided by the third routing apparatus 430 within another data processing time of one second, as indicated by reference numeral 485. The second routing apparatus 420 may transmit the twice-decompressed data to the first routing apparatus 410.

The first routing apparatus 410 may decompress the twice-decompressed data provided by the second routing apparatus 420 within another data processing time of one second, as indicated by reference numeral 486. In this example, the triple-compressed data provided by the fourth routing apparatus 440 becomes larger, passing through the third, second, and first routing apparatuses 430, 420, and 410. The triple-decompressed data obtained by the first routing apparatus 410 may be the same as the data provided by the second component 402. The first routing apparatus 410 may transmit the triple-decompressed data, which may be the same as the original data provided by the second component 402, to the first component 401.

In this example, the network apparatus 400 compresses and decompresses data provided by a source component, and thus, transmits the same data as that original data provided by the source component to a destination component. Therefore, the destination component does not need to additionally compress or decompress the data provided by the network apparatus 400.

Figure 5:
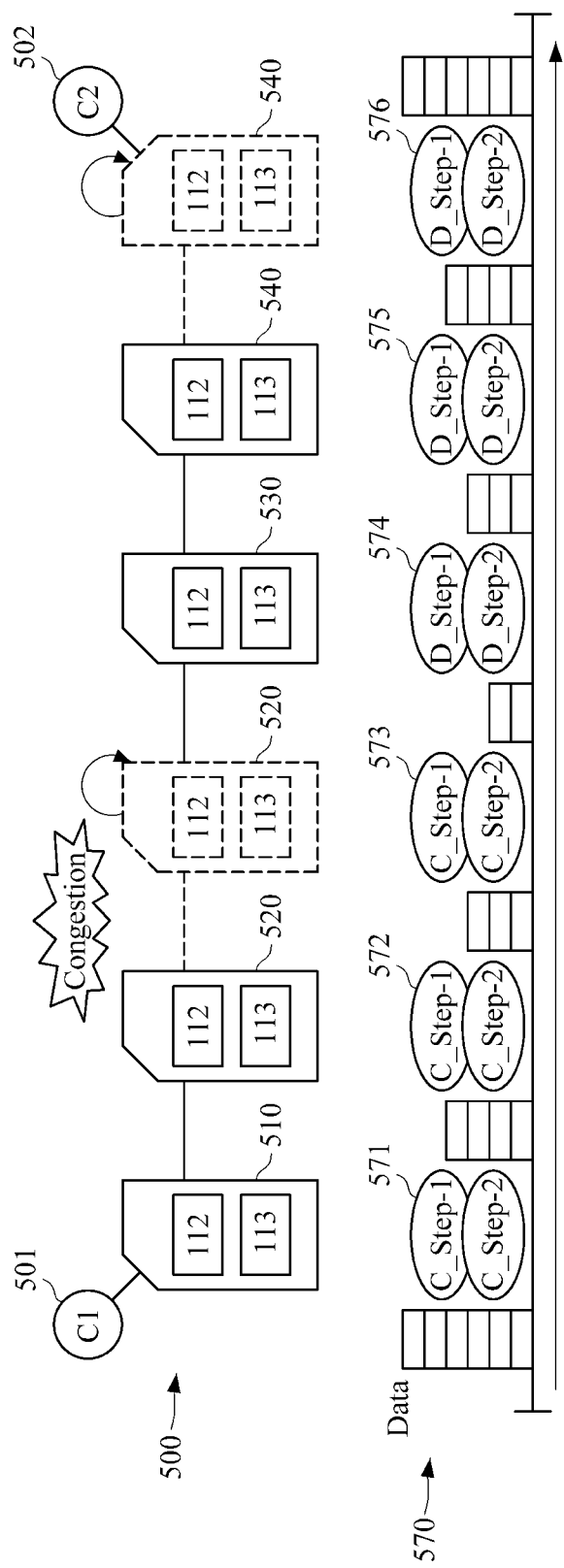
FIG. 5 is a diagram illustrating an example of a non-iterative compression/decompression-type network apparatus network apparatus.

FIG. 5 illustrates another example of an iterative compression/decompression-type network apparatus.

Referring to FIGS. 1 and 5, network apparatus 500 includes a first component 501, a second component 502, and first, second, third, and fourth routing apparatus 510, 520, 530, and 540, respectively. In this example, the first and second routing apparatuses 510 and 520 are classified into a first compression/decompression group, and the third and fourth routing apparatuses 530 and 540 are classified into a second compression/decompression group. Each of the first, second, third and fourth routing apparatuses 510, 520, 530 and 540 may include a determination unit 112 and a compression/decompression unit 113.

Data is transmitted between the first and second components 501 and 502 via the first, second, third, and fourth routing apparatuses 510, 520, 530, and 540. For example, a data processing time of one second may be allocated to each of the first, second, third, and fourth routing apparatuses 510, 520, 530 and 540, and a compression or decompression process may be performed in two stages (i.e., first and second compression or decompression stages) and may include a total of one second (i.e., one half second for the first compression or decompression stage and one half for the compression or decompression stage) to be completed.

If congestion occurs when the compression of data in a routing apparatus is completed and the data is yet to be transmitted to another routing apparatus, the compression/decompression unit of the routing apparatus may continue to compress the data until the congestion is resolved. For example, the determination unit 112 of the routing apparatus may determine whether congestion has occurred or been resolved. For example, the compression/decompression unit 113 of the last routing apparatus in a network apparatus may decompress data until the data is fully decompressed or until the congestion clears.

Referring to reference numeral 570 of FIG. 5, to transmit data to the second component 502, the first component 501 may transmit the data to the first routing apparatus 510. The first routing apparatus 510 may compress the data that is provided by the first component 501 within a data processing time of one second, as indicated by reference numeral 571. For example, the first routing apparatus 510 may perform the first and second compression stages on the data provided by the first component 501. The first routing apparatus 510 may transmit the once-compressed data to the second routing apparatus 520.

The second routing apparatus 520 may compress the once-compressed data that is provided by the first routing apparatus 510 within another processing time of one second, as indicated by reference numeral 572. In this example, the determination unit 113 of the second routing apparatus 520 determines that congestion has occurred. In response, the second routing apparatus 520 may compress the twice-compressed data again, as indicated by reference numeral 573. If the determination unit 113 of the second routing apparatus 520 determines that congestion has been resolved, the second routing apparatus 520 may transmit the triple-compressed data to the third routing apparatus 530. In this example, the data provided by the first component 501 becomes smaller, passing through the first and second routing apparatuses 510 and 520.

The third routing apparatus 530 may decompress the triple-compressed data that is provided by the second routing apparatus 520 within another data processing time of one second, as indicated by reference numeral 574. The third routing apparatus 530 may perform the first and second decompression stages on the triple-compressed data provided by the second routing apparatus 520. The third routing apparatus 530 may transmit the once-decompressed (i.e. twice-compressed) data to the fourth routing apparatus 540.

The fourth routing apparatus 540 may decompress the once-decompressed data that is provided by the third routing apparatus 530 within another data processing time of one second, as indicated by reference numeral 575, thereby obtaining twice-decompressed (i.e. once-compressed) data. In this example, the determination unit 113 of the fourth routing apparatus 540 may determine whether the fourth routing apparatus 540 is the last routing apparatus left in the network apparatus 500 and whether the twice-decompressed has been fully decompressed. In this example, the fourth routing apparatus 540 is the last routing apparatus left in the network apparatus 500 and the twice-decompressed data has not yet been fully decompressed. Accordingly, the fourth routing apparatus 540 may decompress the twice-decompressed data repeatedly, as indicated by reference numeral 576, until the data is fully decompressed. The fourth routing apparatus 540 may transmit the triple-decompressed data to the second component 502. In this example, the data provided by the second routing apparatus 520 becomes larger, passing through the third and fourth routing apparatuses 530 and 540. The fourth routing apparatus 540 may transmit the triple-decompressed data, which may be the same as the original data provided by the first component 501, to the second component 502.

The transmission of data from the second component 502 to the first component 501 is basically the same as the transmission of data from the first component 501 to the second component 502, and thus, a further description thereof is omitted.

According to the example of FIG. 5, it is possible to continuously compress data even after the occurrence of congestion, and thus, it is possible to reduce the amount of data to be transmitted from one component to another component.

Figure 6:
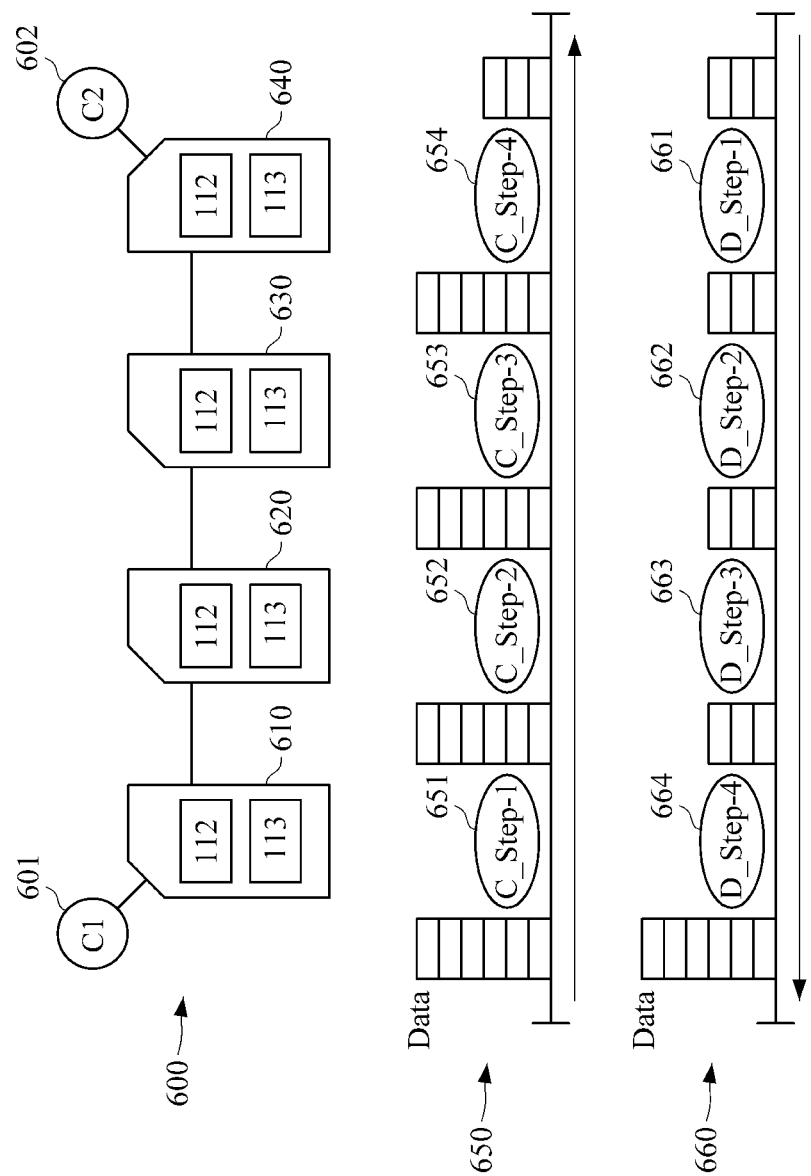
FIG. 6 is a diagram illustrating another example of a non-iterative compression/decompression-type network apparatus network apparatus.

FIG. 6 illustrates an example of a non-iterative compression/decompression-type network apparatus.

Referring to FIG. 6, network apparatus 600 includes a first component 601, a second component 602, and first, second, third, and fourth routing apparatus 610, 620, 630, and 640, respectively. Each of the first, second, third and fourth routing apparatuses 610, 620, 630, and 640 may include a determination unit 112 and a compression/decompression unit 113.

In this example, the compression/decompression unit 113 of each of the first, second, third, and fourth routing apparatuses 610, 620, 630 and 640 may perform only part of a compression process. Data is transmitted between the first and second components 601 and 602 via the first, second, third, and fourth routing apparatuses 610, 620, 630, and 640. For example, a data processing time of one second may be allocated to each of the first, second, third, and fourth routing apparatuses 610, 620, 630 and 640, and that a compression or decompression process may be performed in four stages (i.e., first, second, third, and fourth compression or decompression stages) and may include a total of four seconds (i.e., one second for each of the first, second, third, and fourth compression or decompression stages) to be completed.

Referring to reference numeral 650 of FIG. 6, to transmit data to the second component 602, the first component 601 may transmit the data to the first routing apparatus 610. The first routing apparatus 610 may partially compress the data that is provided by the first component 601 by performing the first compression stage within a data processing time of one second, as indicated by reference numeral 651. The first routing apparatus 610 may transmit the once-partially-compressed data to the second routing apparatus 620.

The second routing apparatus 620 may partially compress the once-partially-compressed data that is provided by the first routing apparatus 610 by performing the second compression stage within another data processing time of one second, as indicated by reference numeral 652. The second routing apparatus 620 may transmit the twice-partially-compressed data to the third routing apparatus 630.

The third routing apparatus 630 may partially compress the twice-partially-compressed data that is provided by the second routing apparatus 620 by performing the third compression stage within another data processing time of one second, as indicated by reference numeral 653. The third routing apparatus 630 may transmit the triple-partially-compressed data to the fourth routing apparatus 640.

The fourth routing apparatus 640 may perform the fourth compression stage on the triple-partially-compressed data that is provided by the third routing apparatus 630 within another data processing time of one second, as indicated by reference numeral 654, thereby obtaining compressed data. In this example, the data provided by the first component 601 becomes smaller, passing through the first, second, third, and fourth routing apparatuses 610, 620, 630, and 640. The fourth routing apparatus 640 may transmit the compressed data to the second component 602.

Referring to reference numeral 660 of FIG. 6, to transmit data to the first component 601, the second component 602 may transmit the data to the fourth routing apparatus 640. The fourth routing apparatus 640 may partially decompress the data that is provided by the second component 602 by performing the first decompression stage within a data processing time of one second, as indicated by reference numeral 661. The fourth routing apparatus 640 may transmit the once-partially-decompressed data to the third routing apparatus 630.

The third routing apparatus 630 may partially decompress the once-partially-decompressed data provided by the fourth routing apparatus 640 by performing the second decompression stage within another data processing time of one second, as indicated by reference numeral 662. The third routing apparatus 630 may transmit the twice-partially-decompressed data to the second routing apparatus 620.

The second routing apparatus 620 may partially decompress the twice-partially-decompressed data provided by the third routing apparatus 630 by performing the third decompression stage within another data processing time of one second, as indicated by reference numeral 663. The second routing apparatus 620 may transmit the triple-partially-decompressed data to the first routing apparatus 610.

The first routing apparatus 610 may perform the fourth decompression stage on the triple-partially-decompressed data provided by the second routing apparatus 620 within another data processing time of one second, as indicated by reference numeral 664, thereby obtaining decompressed data. In this example, the data provided by the second component 602 becomes smaller, passing through the fourth, third, second, and first routing apparatuses 640, 630, 620, and 610. The first routing apparatus 610 may transmit the decompressed data, which may be the same as the original data provided by the second component 602, to the first component 601.

In the example shown in FIG. 6, it is possible to reduce the amount of data to be transmitted, the probability of the occurrence of congestion, power consumption, and the bandwidth used by compressing data and transmitting the compressed data. Thus, it is possible to reduce the size of routing apparatuses. In this example, no memory is needed to compress or decompress data. Moreover, no additional processing time is needed to compress or decompress data.

Figure 7:
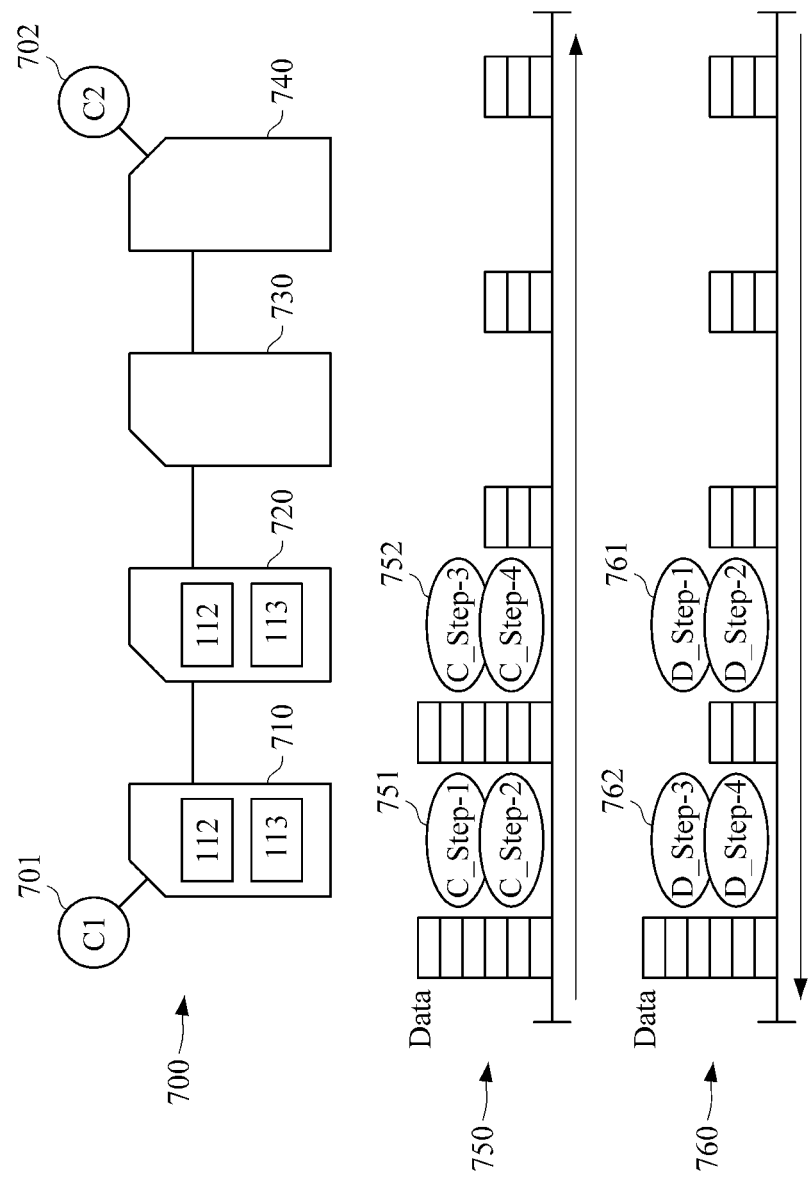
FIG. 7 is a diagram illustrating another example of a non-iterative compression/decompression-type network apparatus network apparatus.

FIG. 7 illustrates another example of a non-iterative compression/decompression-type network apparatus.

Referring to FIG. 7, network apparatus 700 includes a first component 701, a second component 702, and first, second, third, and fourth routing apparatus 710, 720, 730, and 740, respectively. Each of the first and second routing apparatuses 710 and 720 may also include a determination unit 112 and a compression/decompression unit 113.

In this example, each of the compression/decompression unit 113 of each of the first and second routing apparatuses 710 and 720 performs only part of a compression process. Data is transmitted between the first and second components 701 and 702 via the first, second, third, and fourth routing apparatuses 710, 720, 730, and 740. For example, a data processing time of one second may be allocated to each of the first, second, third, and fourth routing apparatuses 710, 720, 730, and 740, and a compression or decompression process may be performed in four stages (i.e., first, second, third, and fourth compression or decompression stages) and may include a total of two seconds (i.e., one half second for each of the first, second, third, and fourth compression or decompression stages) to be completed.

Referring to reference numeral 750 of FIG. 7, to transmit data to the second component 702, the first component 701 may transmit the data to the first routing apparatus 710. The first routing apparatus 710 may partially compress the data that is provided by the first component 701 by performing the first and second compression stages within a data processing time of one second, as indicated by reference numeral 751. The first routing apparatus 710 may transmit the partially-compressed data to the second routing apparatus 720.

The second routing apparatus 720 may perform the third and fourth compression stages on the partially-compressed data that is provided by the first routing apparatus 710 within another data processing time of one second, as indicated by reference numeral 752, thereby obtaining compressed data. In this example, the original data provided by the first component 701 becomes smaller, passing through the first and second routing apparatuses 710 and 720. The second routing apparatus 720 may transmit the compressed data to the third routing apparatus 730. The third routing apparatus 730 may transmit the compressed data provided by the second routing apparatus 720 to the fourth routing apparatus 740. The fourth routing apparatus 740 may transmit the compressed data provided by the third routing apparatus 730 to the second component 702.

Referring to reference numeral 760 of FIG. 7, to transmit data to the first component 701, the second component 702 may transmit the data to the fourth routing apparatus 740. The fourth routing apparatus 740 may transmit the data that is provided by the second component 702 to the third routing apparatus 730. The third routing apparatus 730 may transmit the data provided by the fourth routing apparatus 740 to the second routing apparatus 720.

The second routing apparatus 720 may partially decompress the data that is provided by the third routing apparatus 730 by performing the first and second decompression stages within a data processing time of one second, as indicated by reference numeral 761. The second routing apparatus may transmit the partially-decompressed data to the first routing apparatus 710.

The first routing apparatus 710 may perform the third and fourth decompression stages on the partially-decompressed data provided by the second routing apparatus 720 within another data processing time of one second, as indicated by reference numeral 762, thereby obtaining decompressed data. In this example, the original data provided by the second component 702 becomes larger, passing through the second and first routing apparatuses 720 and 710. The first routing apparatus 710 may transmit the decompressed data, which may be the same as the original data provided by the second component 702, to the first component 701. In the example shown in FIG. 7, not all routing apparatuses necessarily need to have a compression/decompression unit.

According to the example shown in FIG. 7, it is possible to reduce the amount of data to be transmitted, the probability of the occurrence of congestion, power consumption, and the bandwidth used by compressing data and transmitting the compressed data. Thus, it is possible to reduce the size of routing apparatuses. In this example, no memory is needed to compress or decompress data. Moreover, no additional processing time is needed to compress or decompress data.

Figure 8:
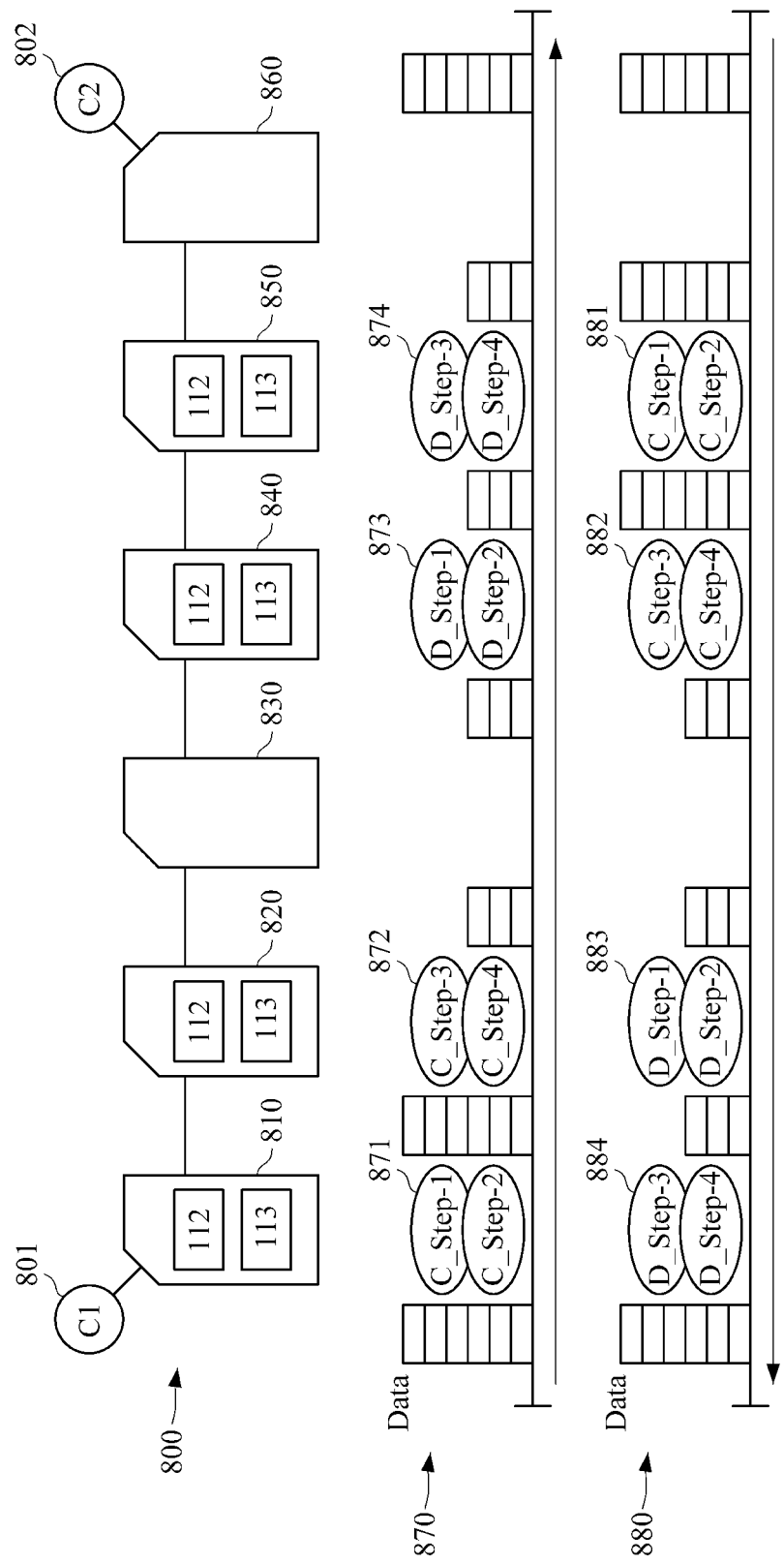
FIG. 8 is a diagram illustrating another example of a non-iterative compression/decompression-type network apparatus network apparatus.

FIG. 8 illustrates another example of a non-iterative compression/decompression-type network apparatus.

Referring to FIG. 8, network apparatus 800 includes a first component 801, a second component 802, and first, second, third, fourth, fifth and sixth routing apparatuses 810, 820, 830, 840, 850, and 860. Each of the first, second, fourth, and fifth routing apparatuses 810, 820, 840, and 850 includes a determination unit 112 and a compression/decompression unit 113. In this example, the first and second routing apparatuses 810 and 820 are classified into a first compression/decompression group, and the fourth and fifth routing apparatuses 840 and 850 are classified into a second compression/decompression group.

The first compression/decompression group may compress data until the data is fully compressed, and the second compression/decompression group may decompress data until the data is fully decompressed. Data may be transmitted between the first and second components 801 and 802 via the first, second, third, fourth, fifth, and sixth routing apparatuses 810, 820, 830, 840, 850, and 860. For example, a data processing time of one second may be allocated to each of the first, second, third, fourth, fifth, and sixth routing apparatuses 810, 820, 830, 840, 850, and 860, and a compression or decompression process may be performed in four stages (i.e., first, second, third, and fourth compression or decompression stages) and may include a total of two second (i.e., one half second for each of the first, second, third, and fourth compression or decompression stages) to be completed.

Referring to reference numeral 870 of FIG. 8, to transmit data to the second component 802, the first component 801 may transmit the data to the first routing apparatus 810. The first routing apparatus 810 may partially compress the data that is provided by the first component 801 by performing the first and second compression stages within a data processing time of one second, as indicated by reference numeral 871. The first routing apparatus 810 may transmit the partially-compressed data to the second routing apparatus 820.

The second routing apparatus 820 may perform the third and fourth compression stages on the partially-compressed data that is provided by the first routing apparatus 810 within another data processing time of one second, as indicated by reference numeral 872, thereby obtaining compressed data. In this example, the data provided by the first component 801 becomes smaller, passing through the first and second routing apparatuses 810 and 820. The second routing apparatus 820 may transmit the compressed data to the third routing apparatus 830.

The third routing apparatus 830 may transmit the compressed data that is provided by the second routing apparatus 820 to the third routing apparatus 840. The fourth routing apparatus 840 may partially decompress the compressed data that is provided by the third routing apparatus 830 by performing the first and second decompression stages within another data processing time of one second, as indicated by reference numeral 873. The fourth routing apparatus 840 may transmit the partially-decompressed data to the fifth routing apparatus 850.

The fifth routing apparatus 850 may perform the third and fourth decompression stages on the partially-decompressed data that is provided by the fourth routing apparatus 840 within another data processing time of one second, as indicated by reference numeral 874, thereby obtaining decompressed data. In this example, the compressed data provided by the second routing apparatus 820 becomes larger, passing through the fourth and fifth routing apparatuses 840 and 850. The decompressed data obtained by the fifth routing apparatus 850 may be the same as its original counterpart provided by the first component 801. The fifth routing apparatus 850 may transmit the decompressed data to the sixth routing apparatus 860.

The sixth routing apparatus 860 may transmit the decompressed data that is provided by the fifth routing apparatus 850 to the first component 806. In the example shown in FIG. 8, not all routing apparatuses necessarily need to have a compression/decompression unit.

The transmission of data from the second component 802 to the first component 801 is basically the same as the transmission of data from the first component 801 to the second component 802, and thus, a further description thereof is omitted.

In various aspects, a routing apparatus may include a determination unit that may determine whether congestion has occurred and a compression/decompression unit, which, if congestion occurs, may continue to compress data until the congestion is resolved.

In various aspects, a routing apparatus may include a determination unit for determining whether the routing apparatus is the last routing apparatus on the path of the transmission of input data and whether the input data has been fully decompressed. In this example, if the routing apparatus is the last routing apparatus on the path of the transmission of the input data and the input data has not yet been fully decompressed, the compression/decompression unit may repeatedly decompress until the input data is fully decompressed.

Various aspects are directed to a network apparatus that may compress and decompress input data one or more times throughout the course of the transmission of the input data from a source component to a destination component, and may provide the original data provided by the source component to the destination component. Therefore, there is no need for the destination component to perform additional compression or decompression.

Figure 9:
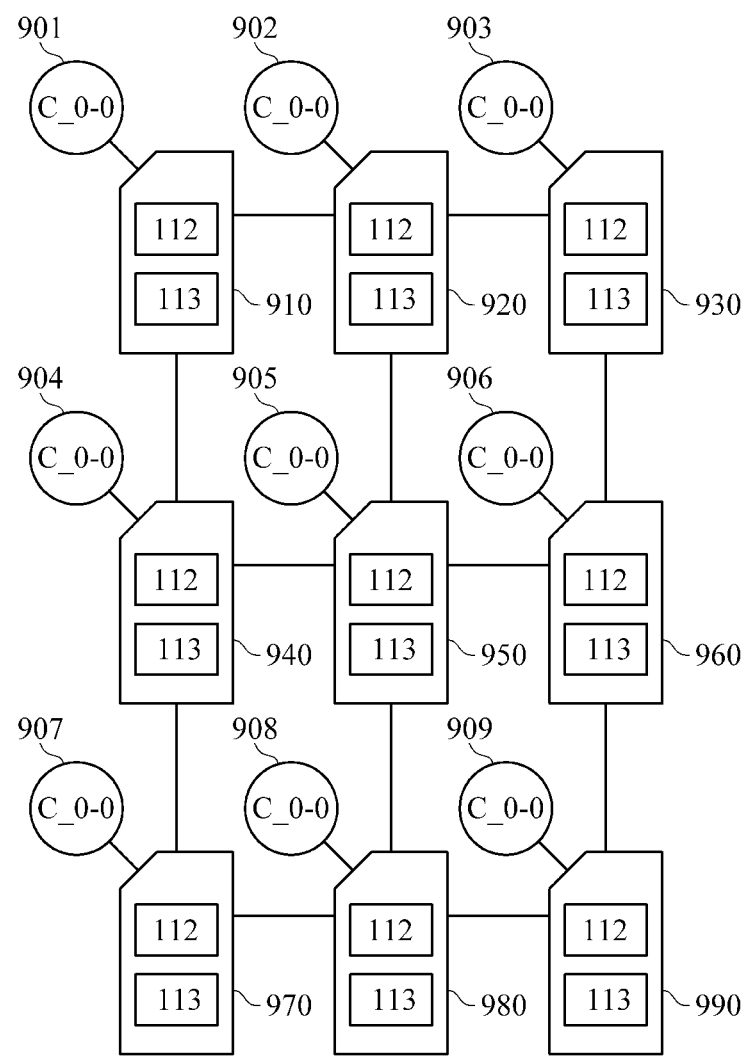
FIG. 9 is a diagram illustrating an example of a mesh-type network apparatus.

FIG. 9 illustrates an example of a mesh topology network apparatus.

Referring to FIG. 9, the network apparatus includes nine components 901, 902, 903, 904, 905, 906, 907, 908, and 909 and nine routing apparatuses 910, 920, 930, 940, 950, 960, 970, 980, and 990. The nine components 901, 902, 903, 904, 905, 906, 907, 908, and 909 and the nine routing apparatuses 910, 920, 930, 940, 950, 960, 970, 980, and 990 may form mesh topology, but the network apparatus described herein is not restricted to this. For example, the nine components 901, 902, 903, 904, 905, 906, 907, 908, and 909 and the nine routing apparatuses 910, 920, 930, 940, 950, 960, 970, 980, and 990 may form a torus topology, a tree topology, a star topology, a crossbar topology, a ring topology, and the like.

In short, an example of a network apparatus can configure various shapes of topologies.

Various aspects are directed towards a network apparatus, for example, a network-on-chip (NOC). The network apparatus may comprise a first component that transmits/receives data to and from a second component. The network apparatus may also include the second component. For example, a data transmission path exists between the first component and the second component.

The network apparatus may include a first data router on the data transmission path between the first component and the second component. The first data router may compress or decompress data that is transmitted between the first component and the second component. The network apparatus may include a second data router on the data transmission path between the first component and the second component, and the second data router may compress or decompress data that is transmitted between the first component and the second component.

For example, the first component may transmit data to the first data router, the first data router may transmit data to the second data router, and the second data router may transmit data to the second component. In this example, the first data router may compress data and the second data router may decompress data received from the first data router, when data is transmitted from the first component to the second component.

As another example, the second component may transmit data to the second router, the second router may transmit data to the first router, and the first router may transmit data to the first component. In this example, the second data router may compress data and the first data router decompress data received from the second data router, when data is transmitted from the second component to the first component.

As an example, the first data router may comprise a determining unit for determining whether there is congestion on the data transmission path between the first component and the second component. In response to the determining unit determining there is congestion, the first data router may continue to compress the transmitted data until the data is fully compressed or until the congestion is resolved.

In various aspects, the first data router may be a plurality of first data routers that each perform a stage of the compression, and/or the second data router may be a plurality of second data routers that each perform a stage of the decompression. In this example, the final second data router on the data transmission path may comprise a determining unit to determine whether additional decompression is to be performed. For example, in response to performing a stage of decompression, the determining unit may determine whether there is additional decompression to be performed, and if there is additional decompression to be performed, the final second data router may continue to perform stages of decompression until the data is fully decompressed.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A routing apparatus comprising:
a compression/decompression unit configured to enable compressing or decompressing of input data completely, or partially in cooperation with another routing apparatus, within a data processing time, the data processing time being a period of time between the time when data is received and the time when the data is output;
a transmission unit configured to transmit the compressed input data or decompressed input data; and
a determination unit configured to determine whether the routing apparatus is a last routing apparatus on a path of the transmission of the input data and whether the input data has been fully decompressed,
wherein the partial compressing or decompressing of the input data comprises performing a stage of compression or decompression without compressing or decompressing the input data.

2. The routing apparatus of claim 1,
wherein the determination unit is configured to determine whether congestion has occurred and/or whether congestion has been resolved,
wherein, in response to congestion occurring, the compression/decompression unit continues to compress the input data until the congestion is resolved.

3. The routing apparatus of claim 1,
wherein, in response to the routing apparatus being the last routing apparatus on the path of the transmission of the input data and the input data has not yet been fully decompressed, the compression/decompression unit decompresses the input data until the input data is fully decompressed.

4. The routing apparatus of claim 1, further comprising a memory unit configured to temporarily store at least one of the input data, the compressed input data, and the decompressed input data.

5. The routing apparatus of claim 1, wherein the transmission unit comprises:
a switching module; and
a control module configured to control the switching module to transmit at least one of the compressed input data and the decompressed input data to a next routing apparatus.

6. A network apparatus that transmits data via a plurality of routing apparatuses, each of the routing apparatuses comprising:
a compression/decompression unit configured to compress or decompress input data within a data processing time, and the data processing time is a length of time between the time when data is received and the time when the data is output;
a transmission unit configured to transmit the compressed or decompressed input data; and
a determination unit configured to determine whether the routing apparatus is a last routing apparatus on a path of the transmission of the input data and whether the input data has been fully decompressed, wherein the routing apparatuses use an iterative compression/decompression mode in order to compress and/or decompress the input data more than one time throughout a course of the transmission of the input data, and two or more compression/decompression units of the routing apparatuses are configured to compresses or decompress the input data completely, or partially in cooperation with another compression/decompression unit of the routing apparatuses; and the partial compressing or decompressing of the input data comprises performing a stage of compression or decompression without compressing or decompressing the input data.

7. The network apparatus of claim 6, wherein the compression/decompression units of the routing apparatuses are classified into a first compression/decompression group that compresses the input data throughout a course of the transmission of the input data, and a second compression/decompression group that decompresses the compressed input data provided by the first compression/decompression group throughout the course of the transmission of the input data.

8. The network apparatus of claim 6, wherein each of the routing apparatuses further comprises:

the determination unit which is configured to determine whether congestion has occurred or been resolved, wherein, in response to congestion being determined, the compression/decompression unit of the routing apparatus continues to compress the input data until the congestion is resolved.

9. The network apparatus of claim 6, wherein the compression/decompression units of the corresponding routing apparatus repeatedly decompress the input data until the input data is fully decompressed, in response to the corresponding routing apparatus being the last routing apparatus on the path of the transmission of the input data and the input data has not yet been fully decompressed.

10. A network apparatus which transmits data via a plurality of routing apparatuses, each of the routing apparatuses comprising:

a compression/decompression unit configured to compress or decompress input data within a data processing time, and the processing time is a length of time between the time when data is received and the time when the data is output;

a transmission unit configured to transmit the compressed or decompressed input data; and a determination unit configured to determine whether the routing apparatus is a last routing apparatus on a path of the transmission of the input data and whether the input data has been fully decompressed, wherein the routing apparatuses use a non-iterative compression/decompression mode in order to compress or decompress the input data only once throughout a course of the transmission of the input data, and two or more compression/decompression units of the routing apparatuses are configured to partially compress or decompress the input data in cooperation with another compression/decompression unit of the routing apparatuses;

and the partial compressing or decompressing of the input data comprises performing a stage of compression or decompression without compressing or decompressing the input data.

11. The network apparatus of claim 10, wherein the compression/decompression units of the routing apparatuses are classified into a first compression/decompression group each compressing the input data only once throughout a course of the transmission of the input data, and a second compression/decompression group each decompressing the compressed input data provided by the first compression/decompression group only once throughout the course of the transmission of the input data.

12. The network apparatus of claim 10, wherein each of the routing apparatuses further comprises:

the determination unit which is configured to determine whether congestion has occurred or been resolved, wherein, in response to congestion being determined, the compression/decompression unit of the routing apparatus continues to compress the input data until the congestion is resolved.

13. The network apparatus of claim 10, wherein the compression/decompression unit of the corresponding routing apparatus repeatedly decompresses the input data until the input data is fully decompressed, in response to the corresponding routing apparatus being the last routing apparatus on the path of the transmission of the input data and the input data has not yet been fully decompressed.

14. A network-on-chip (NOC) comprising:

a first component that transmits/receives data to and from a second component;

a first data router on a data transmission path between the first component and the second component, and the first data router compresses data that is transmitted between the first component and the second component;

a second data router on the data transmission path between the first component and the second component, and the second data router decompresses data that is compressed by the first routing apparatus and that is transmitted between the first component and the second component; and a determination unit configured to determine whether the routing apparatus is a last routing apparatus on a path of the transmission of the input data and whether the input data has been fully decompressed, wherein the first data router and the second data router are each configured to enable compressing or decompressing of the input data completely, or partially in cooperation with another data router; and the partial compressing or decompressing of the input data comprises performing a stage of compression or decompression without compressing or decompressing the input data.

15. The NOC of claim 14, wherein the determination unit is configured to determine whether there is congestion on the data transmission path between the first component and the second component, and in response to the determination unit determining there is congestion, the first data router compresses the transmitted data until the data is fully compressed or until the congestion is resolved.

16. The NOC of claim 14, wherein the first data router is a plurality of first data routers that each perform a stage of the compression, and the second data router is a plurality of second data routers that each perform a stage of the decompression.

17. The NOC of claim 16, wherein the final second data router on the data transmission path comprises the determination unit which is configured to determine whether additional decompression is to be performed; and in response to performing a stage of decompression, the determination unit determines whether there is additional decompression to be performed, and in response to there being additional decompression to be performed, the final second data router continues to perform stages of decompression until the data is fully decompressed.

18. The NOC of claim 14, wherein the first data router compresses data and the second data router decompresses data, when data is transmitted from the first component to the second component, and the second data router compresses data and the first data router decompresses data, when data is transmitted from the second component to the first component.

19. The network apparatus of claim 10, wherein the partial compressing or decompressing of input data comprises performing two or more stages of compression or decompression without compressing or decompressing the input data.

\* \* \* \* \*